United States Patent
Nagoya et al.

(10) Patent No.: US 7,484,244 B2
(45) Date of Patent: Jan. 27, 2009

(54) APPARATUS, METHOD, AND SYSTEM FOR VIRUS DETECTION

(75) Inventors: Mitsugu Nagoya, Tokyo (JP); Mitsuji Matsumoto, Kamakura (JP)

(73) Assignee: Duaxes Corporation, Tokyo (JP)

( * ) Notice: Subject to any disclaimer, the term of this patent is extended or adjusted under 35 U.S.C. 154(b) by 610 days.

(21) Appl. No.: 10/302,943

(22) Filed: Nov. 25, 2002

(65) Prior Publication Data

US 2003/0105975 A1 Jun. 5, 2003

(30) Foreign Application Priority Data

Nov. 30, 2001 (JP) .............................. 2001-366884

(51) Int. Cl.
*G06F 11/00* (2006.01)
(52) U.S. Cl. ......................... 726/24; 713/152
(58) Field of Classification Search ................. 713/323, 713/324
See application file for complete search history.

(56) References Cited

U.S. PATENT DOCUMENTS

| | | | |
|---|---|---|---|
| 5,832,208 A * | 11/1998 | Chen et al. | ..................... 726/24 |
| 6,591,362 B1 * | 7/2003 | Li | ................................. 713/1 |
| 6,901,519 B1 * | 5/2005 | Stewart et al. | ................. 726/24 |
| 7,107,618 B1 * | 9/2006 | Gordon et al. | ................ 726/24 |
| 2003/0188196 A1 * | 10/2003 | Choi | ........................... 713/201 |

FOREIGN PATENT DOCUMENTS

| | | |
|---|---|---|
| JP | 11-134190 | 5/1999 |
| JP | 2001-111824 | 4/2001 |
| WO | WO95/33237 | 12/1995 |
| WO | 98/10342 | 3/1998 |
| WO | 98/45778 | 10/1998 |

OTHER PUBLICATIONS

Sun Microsystems: "Introduction to JTAG Boundary Scan" 'Online! Jan. 1997.
"Automated Program Analysis for Computer Virus Detection" IBM Technical Disclosure Bulletin, IBM Corp. New York, US, vol. 34, No. 2, Jul. 1, 1991, pp. 415-416.

* cited by examiner

*Primary Examiner*—Pramila Parthasarathy
(74) *Attorney, Agent, or Firm*—Manabu Kanesaka

(57) ABSTRACT

An object of the present invention is to provide an apparatus, a method, and a system for virus detection which can find even an unknown virus easily with no OS dependency. To achieve the foregoing object, the present invention provides a virus detection apparatus including an inspection computer to be connected to a mail server. The inspection computer includes file opening means for opening an attachment of e-mail transferred from said mail server, an I/O port for establishing interface connection with a PC, the PC being connected to the inspection computer to send and receive e-mail to/from the mail server through the inspection computer, virus inspecting means for detecting data of the attachment opened by said file opening means for access to said I/O port to inspect virus invasion, and warning means for outputting a warning signal from the virus inspecting means when access to the I/O port is detected.

13 Claims, 4 Drawing Sheets

APPARATUS, METHOD, AND SYSTEM FOR VIRUS DETECTION

BACKGROUND OF THE INVENTION

1. Field of the Invention

The invention relates to an apparatus, a method, and a system for detecting an attachment of e-mail for macro viruses.

2. Description of the Prior Art

With the recent prevalence of PCs and the Internet, information exchange by means of e-mail is growing in use. It is often the case now that ones with evil intent hide viruses in attachments of e-mail so that users unaware of it open the attachments to let the viruses invade their PCs. Such viruses are called macro viruses since they adhere to certain application software and infect upon the execution of the software procedure. When macro viruses invade a PC, document files may be tampered with arbitrarily or an unintended screen may appear during system startup.

When a number of PCs, such as corporate PCs, are connected over a LAN, a number of PCs can be exposed to virus attack at a time.

Among the known methods for protecting a computer system from such computer viruses is one using so-called vaccines. Vaccines are a kind of dedicated software, containing a database that defines the patterns of viruses found and reported so far. Upon virus invasion, the vaccines collate the pattern of the virus with the patterns of the viruses stored in the database to identify the invading virus.

The foregoing virus inspection using vaccine software, however, has the problem that it is effective against known viruses but hardly effective against unknown viruses. In addition, the database must be modified each time a new type of virus is found and reported. This requires that the vaccine users constantly update the vaccine software for data renewal. Moreover, such vaccine software is dependent on the computer OS (Operating System), having a problem of unavailability on different OSes.

SUMMARY OF THE INVENTION

The present invention has been achieved to solve the foregoing conventional problems. It is thus an object of the present invention to provide an apparatus, a method, and a system for virus detection which can find even an unknown virus easily with no OS dependency.

A virus detection apparatus according to the present invention includes an inspection computer to be connected to a mail server. The inspection server includes: file opening means for opening an attachment of e-mail transferred from the mail server; an I/O port for establishing interface connection with a PC, the PC being connected to the inspection computer to send and receive e-mail to/from the mail server through the inspection computer; virus inspecting means for detecting data of the attachment opened by the file opening means for access to the I/O port to inspect virus invasion; and warning means for outputting a warning signal from the virus inspecting means when access to the I/O port is detected. Viruses have the functions of infecting exterior through various peripheral devices, overwriting the contents of internal memories and external input/output devices, and sending unnecessary mail to other servers. Viruses thus drive various peripheral devices mapped to the I/O port. According to the configuration of the present invention, the I/O port can be monitored to detect access to the I/O port. It is therefore possible to realize a virus detection apparatus that can find even a new type of virus easily with no OS dependency.

In the virus detection apparatus of the present invention, the warning means can inform users of virus invasion immediately. A preventive measure can thus be taken against virus infection.

Moreover, in the virus detection apparatus of the present invention, the virus inspecting means supports boundary scan communications, and acquires access information on the I/O port from the data of the attachment and sends the access information to the mail server. According to this configuration, it is possible to know which port of the I/O port is accessed by the invading virus.

In the virus detection apparatus of the present invention, communication is conducted between the virus inspecting means and the mail server through any of a printer port, a parallel input/output device, a serial input/output device, and a boundary scan communication device installed on the mail server, whereby a determination is made as to the access information on the I/O port acquired from the attachment by the virus inspecting means. According to this configuration, the access information on the I/O port can be sent and received by a route or clock independent of the inspection computer.

The virus detection apparatus of the present invention also includes means for detecting the data of the attachment for access to a memory or an external input/output device, the memory or the external input/output device being peripheral equipment of the PC. According to this configuration, viruses can also be detected when the viruses try to make access to the internal memory or certain files such as an OS.

The virus detection apparatus of the present invention also includes means for disabling memory access to the inspection computer. According to this configuration, it is possible to prevent viruses from accessing the memory to destroy data in the memory.

A virus detection method of the present invention includes the steps of: opening, in an inspection computer, an attachment of e-mail transferred from a mail server to execute a macro of the attachment; and determining presence or absence of access to an I/O port from data of the attachment by using an I/O port check board, the I/O port establishing interface connection between the inspection computer and peripheral equipment of a PC. According to this method, it is possible to realize a virus detection method that can find even a new type of virus easily with no OS dependency.

In the virus detection method of the present invention, the presence or absence of write access to the I/O port is determined by the I/O port check board, and the determination is transferred to the mail server. This method allows the virus-adhering attachment to be recovered on the mail-server side.

Moreover, in the virus detection method of the present invention, the data of the attachment is inspected for access to a memory or a hard disk, the memory or the hard disk being peripheral equipment of the PC. According to this method, viruses can also be detected when the viruses try to make access to the internal memory or certain files such as an OS.

A virus detection system of the present invention includes a mail server and an inspection computer connected to the mail server. The inspection computer includes: file opening means for opening an attachment of e-mail transferred from the mail server; an I/O port for establishing interface connection between the inspection computer and peripheral equipment of a PC; and an I/O port check board for detecting data of the attachment opened by the file opening means for access to the I/O port to inspect virus invasion. The attachment of the e-mail transferred from the mail server is opened and executed, is inspected and determined for presence or absence of access to the I/O port by using the I/O port check board. In the presence of access, the result of the inspection and determination is sent to the mail server to notify of the presence or absence of virus infection. According to this system, unknown viruses adhering to attachments of e-mail can be detected easily.

In the virus detection system of the present invention, the mail server determines the presence or absence of the virus infection, and if there is the possibility of infection of a virus, the virus is removed from the attachment before e-mail including the attachment is sent to its original destination. According to this system, safe e-mail from whose attachments viruses are removed can be sent to users.

As described above, the virus detection apparatus of the present invention includes an inspection computer connected to a mail server, the inspection computer including: the file opening means for opening an attachment of e-mail received from the mail server; the virus inspecting means for detecting data of the open attachment for access to the I/O port to inspect virus invasion; and the warning means for outputting a warning signal when access to the I/O port is detected. Detecting the access to the I/O port makes it possible to realize a virus detection apparatus that can find even a new type of virus easily with no OS dependency.

The virus detection method of the present invention opens an attachment of e-mail received from a mail server to execute a macro of the attachment, and checks data of the attachment for write access to a certain I/O port by using an I/O port check board. It is therefore possible to realize a virus detection method that can find even a new type of virus easily with no OS dependency.

The virus detection system of the present invention includes: an inspection computer which opens an attachment of e-mail received from a mail server to execute a macro thereof, inspects access to a certain I/O port by using an I/O port check board, and sends the result of inspection to the mail server; and the mail server which receives the result of inspection from the inspection computer and determines the presence or absence of virus infection. Unknown viruses adhering to attachments of e-mail can thus be inspected by a simple system configuration, so that virus-removed safe attachments can be sent to their original destinations.

The object and advantages of the present invention will become more apparent from the following description of the preferred embodiments which is given with reference to the accompanying drawings.

DESCRIPTION OF THE PREFERRED EMBODIMENTS

Hereinafter, embodiments of the present invention will be described with reference to the drawings.

First Embodiment

Figure 1:
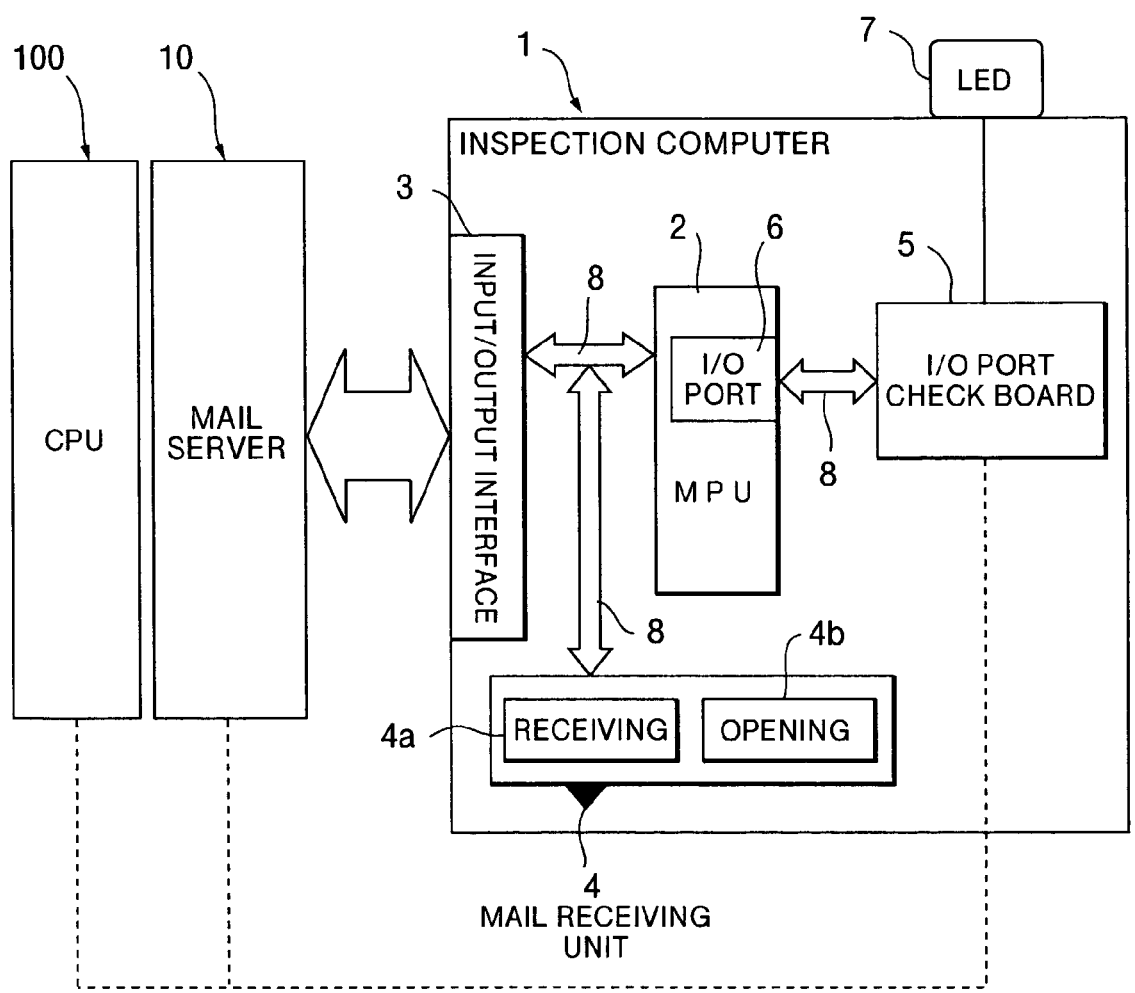
FIG. 1 is a block diagram showing the configuration of a virus detection apparatus according to a first embodiment of the present invention.

FIG. 1 shows the configuration of a virus detection apparatus according to a first embodiment of the present invention. In FIG. 1, an inspection computer 1 includes an MPU 2, an input/output interface 3, a mail receiving unit 4 including mail receiving means 4a and mail opening means 4b, an I/O port check board 5, an I/O port 6, an LED 7, and the like. These components are connected with a PCI bus 8.

The MPU 2 is provided with the I/O port 6 which connects the inspection computer 1 and peripheral equipment. The I/O port 6 is an interface for establishing connection to RS232C, a keyboard, a mouse, a display, a disk drive, a GP-IB (General Purpose Interface Bus), an NIC (Network Interface Card), an RTC (Real Time Clock), and the like (not shown), with the respective addresses allocated thereto. The MPU 2 also has a CPU for performing various operations to control the entire apparatus, a ROM containing an OS and application programs, an SRAM for holding data temporarily, a flash memory (EEPROM) containing instructions or other data for controlling the operation of the CPU, and so on. For the OS, the inspection computer 1 adopts predetermined basic software such as Windows™ 2000.

The mail receiving means 4a of the mail receiving unit 4 receives e-mail with attachments or the attachments alone from a mail server 10 through the input/output interface 3. The mail opening means 4b opens the attachments received to execute macros of the attachments. These operations are performed under the control of the MPU 2.

The I/O port check board 5 detects certain write access to the I/O port 6 which is arranged in the MPU 2, thereby inspecting virus invasion. When the certain write access is detected by the I/O port check board 5, a signal indicating the possibility of a virus is output from the I/O port check board 5 to the LED 7. Consequently, users can see the possible virus infection easily when the LED 7 lights up. The determination on the write access to the I/O port 6, i.e., the result of inspection as to the presence or absence of a virus is transferred from the I/O port check board 5 to the mail server 10 so that the presence or absence of the virus is inspected. A signal for notifying of the possible virus infection is also transferred to other CPUs such as a CPU 100 which is connected over a LAN.

Figure 2:
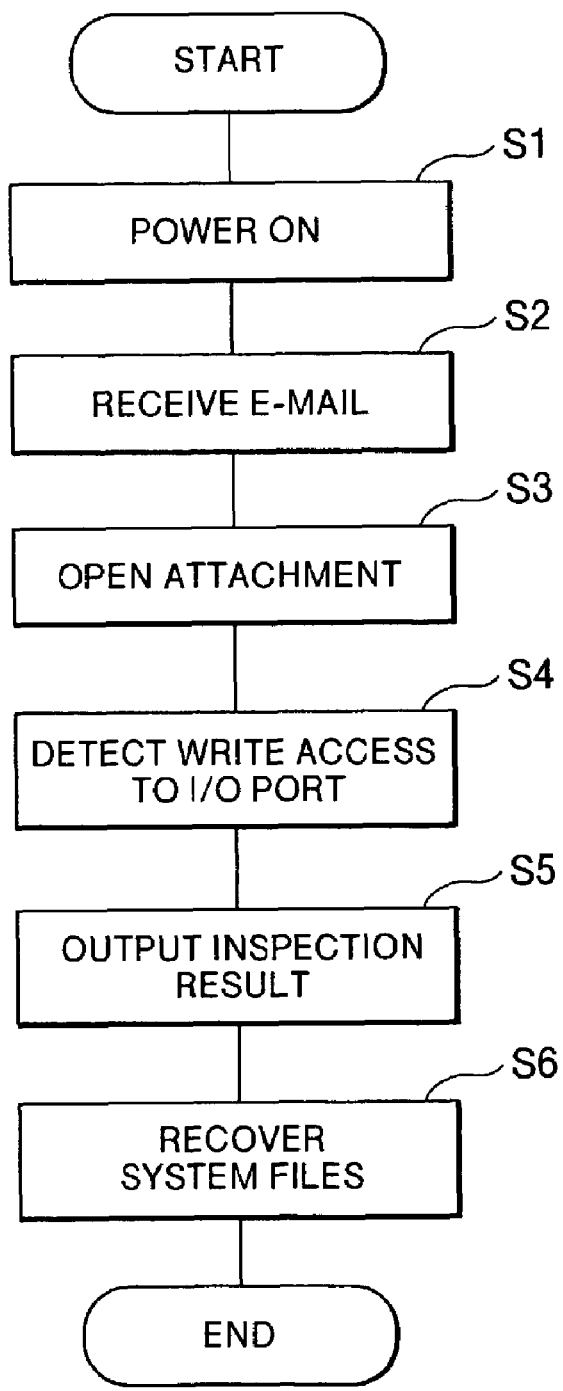
FIG. 2 is a flowchart showing the operation of the virus detection apparatus according to the first embodiment of the present invention.

Next, the operation of the virus detecting apparatus used in this first embodiment will be described with reference to the flowchart of FIG. 2.

In the present embodiment, description will be given of the case where e-mail having a virus-infected attachment is received. In FIG. 2, the power is initially turned on to start up the inspection computer 1 (step S1). Mail is received from the mail server 10 (step S2). An application determined by the extension of the attachment received is launched to open the attachment (step S3). If the attachment is infected with a virus, the macro of the virus is executed and write access is made to the I/O port 6 when this attachment is opened. Then, the I/O port check board 5 detects the macro of the attachment for write access to the I/O port 6 (step S4). If the write access is made, a signal indicating so is posted to the mail server 10 and the other CPU 100 connected over the other LAN. In addition, the LED 7 is lit to inform the users of the possible virus infection (step S5). In the mean time, timer-based monitoring is performed, so that applications launched after a lapse of certain time are terminated (the timer is cancelled if the applications end before the timer setting) to release the objects. The execution of the macro may possibly infect the inspection computer with a virus. Then, the infected application(s) or all the necessary files are finally reinstalled for file restoration (step S6).

While the present embodiment has dealt with the case where virus infection is assumed, the LED 7 also lights up to inform the users of possible virus infection when attachments containing virus-uninfected normal programs are received and opened by the mail opening means 4b of the mail receiving unit. In this case, the programs are determined to be normal through the inspection for virus infection in the subsequent processing.

In the present embodiment, the application programs for the inspection computer 1 to launch for virus check shall be limited to Word™ and Excel™ from Microsoft Corporation. In order to cope with viruses of future scheduling type, the system time shall be set a predetermined time ahead.

As above, according to this first embodiment, the inspection computer has the mail receiving unit for opening an attachment of e-mail received from the mail server to execute the macro, the I/O port check board for detecting the data of the open file for write access to the I/O port to inspect virus invasion, and the LED for issuing a warning when the write access to the I/O port is detected. It is therefore possible to realize a virus detection apparatus that can find even a new type of virus easily with no OS dependency.

Second Embodiment

Figure 3:
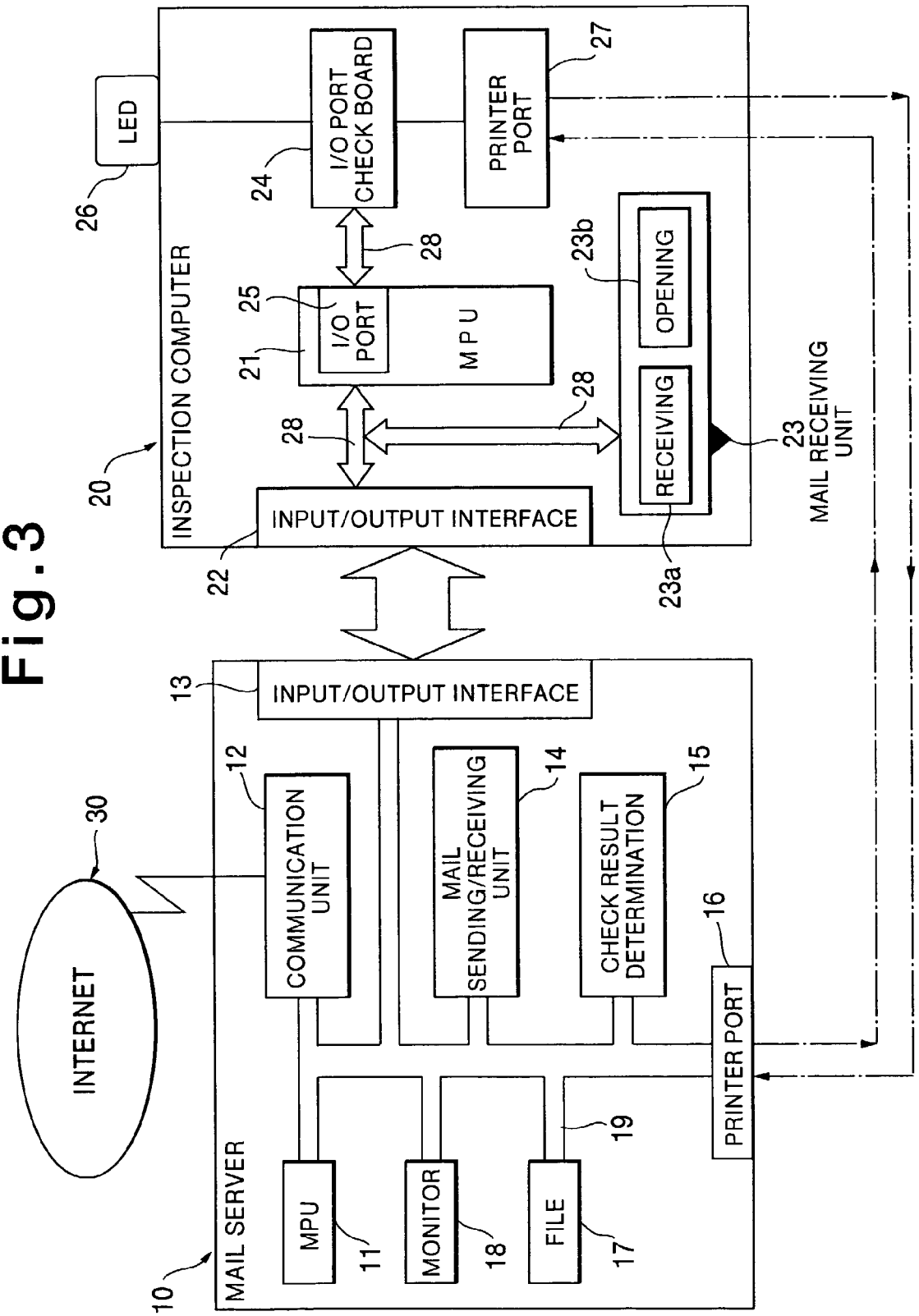
FIG. 3 is a block diagram showing the configuration of a virus detection system according to a second embodiment of the present invention.

FIG. 3 shows the configuration of a virus detection system according to a second embodiment of the present invention. In FIG. 3, a mail server 10 is connected to the Internet 30. The mail server 10 includes an MPU 11, a communication unit 12, an input/output interface 13, a mail sending/receiving unit 14, a check result determination unit 15, a printer port 16, a log file 17, a monitor 18, and the like. These components are connected with a PCI bus 19. The MPU 11 consists of a CPU for performing various operations to control the entire apparatus, a ROM containing an OS and application programs, an SRAM for holding data temporarily, a flash memory (EEPROM) containing instructions or other data for controlling the operation of the CPU, and so on. In the second embodiment, LINUX is adopted as the OS of the mail server 10. The communication unit 12 contains communication protocols capable of access to the Internet 30. The mail sending/receiving unit 14 sends and receives e-mail through the communication unit 12. The check result determination unit 15 determines whether or not an attachment is infected with a virus. The determination is displayed on the monitor 18 and stored into the log file 17. The printer port 16 conducts communication with an I/O port check board 24 when an attachment of e-mail may be infected with a virus. The printer port 16 has a printer driver interface. While the mail server in the present embodiment uses the printer port, the same effect can be obtained by using a parallel input/output device, a serial input/output device, a boundary scan communication device, or the like.

Now, an inspection computer 20 includes an MPU 21, an input/output interface 22, a mail receiving unit 23 including mail receiving means 23a and mail opening means 23b, the I/O port check board 24 which is capable of boundary scan tests, an I/O port 25, an LED 26, a printer port 27, and the like. These components are connected with a PCI bus 28. The MPU 21 is provided with the I/O port 25 which establishes connection between the inspection computer 20 and peripheral equipment. The I/O port 25 is an interface for establishing connection to RS232C, a keyboard, a mouse, a display, a disk drive, a GP-IB (General Purpose Interface Bus), an NIC (Network Interface Card), an RTC (Real Time Clock), and the like, with the respective addresses allocated thereto. The MPU 21 also has a CPU for performing various operations to control the entire apparatus, a ROM containing an OS and application programs, an SRAM for holding data temporarily, a flash memory (EEPROM) containing instructions or other data for controlling the operation of the CPU, and so on. In the present embodiment, predetermined basic software such as Windows™ 2000 is also adopted as the OS of the inspection computer 20.

The mail receiving means 23a of the mail receiving unit 23 receives e-mail with attachments or the attachments alone from the mail server through the input/outputs interface 22. The mail opening means 23b open the attachments received to execute macros. These operations are performed under the control of the MPU 21.

The I/O port check board 24 detects certain write access to the I/O port 25 which is arranged in the MPU 21, thereby inspecting virus invasion. When the certain write access is detected by the I/O port check board 24, a signal indicating the possibility of a virus is output from the I/O port check board 24 to the LED 26. Consequently, users can see the possible virus infection easily when the LED 26 lights up. The determination on the write access to the I/O port 25, i.e., the result of inspection as to the presence or absence of a virus is transferred from the I/O port check board 24 to the mail server 10 so that the presence or absence of the virus is inspected. Besides, a signal indicating the possible virus infection is transferred to other CPUs such as a LAN-connected CPU (see FIG. 1). The printer port 27 conducts communication with the printer port 16, having a printer driver interface.

Figure 4:
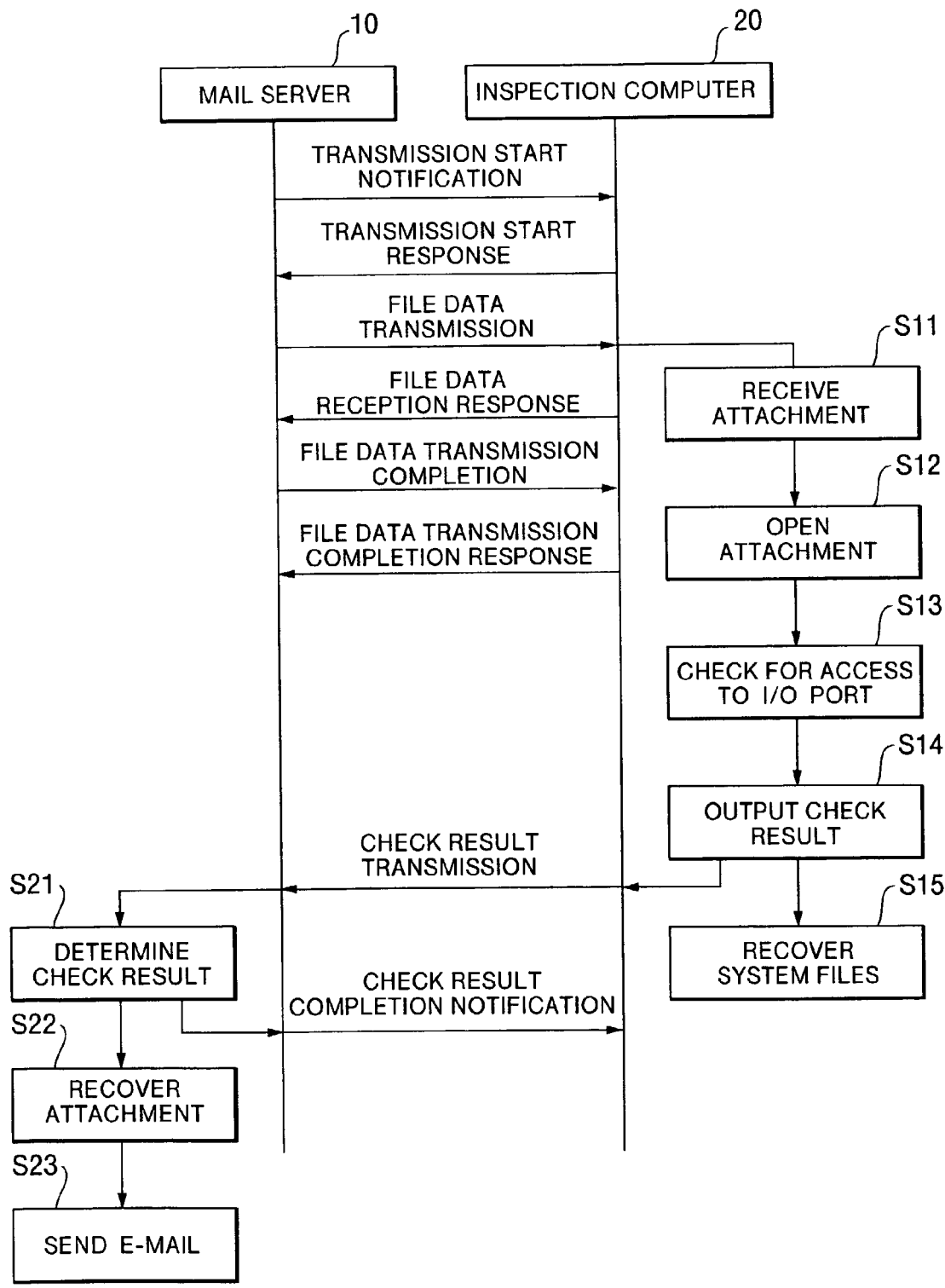
FIG. 4 is a flowchart showing the operation of the virus detection system according to the second embodiment of the present invention.

Next, the operation of the virus detecting system in this second embodiment will be described with reference to the flowchart of FIG. 4. In order to cope with viruses of future scheduling type, the system time shall be set a predetermined time ahead. Initially, the mail server 10 receives e-mail from the Internet 30 through the communication unit 12. The mail server 10 acquires an attachment of the mail, if any, and stores the same into a memory in the MPU 11. Then, the input/output interface 13 exchanges communication procedures with the input/output interface 22 of the inspection computer 20 so that the mail receiving unit 23 of the inspection computer 20 receives attachment data sent from the mail server 10 (step S11). In the inspection computer 20, when the reception of the file data is completed, the mail opening means 23b of the mail receiving unit 23 determine the application to be launched based on the extension of the attachment received, and execute the macro to open the attachment (step S12). Next, the I/O port check board 24 checks whether the attachment accesses the I/O port 25 (step S13). The check result is sent from the printer port 27 to the printer port 16 of the mail server 10. Moreover, if select information exists, there is the possibility of virus infection. Thus, a display appears on-screen or the LED 26 lights up to warn users of it (step S14). In the mean time, timer-based monitoring is performed, so that applications launched after a lapse of certain time are terminated (the timer is cancelled if the applications end before the timer setting). The execution of the macro may possibly infect the inspection computer 20 with a virus. Then, the infected application(s) or all the necessary files are reinstalled for file restoration (step S15).

While the check result is transmitted from the inspection computer 20 to the mail server 10, the mail server 10 performs timer-based monitoring. If the mail server 10 receives no check result within a predetermined time, it issues an alarming notification to the inspection computer 20 and repeats a retry from the beginning a predetermined number of times. The check result determination unit 15 of the mail server 10 determines whether or not the I/O port 25 is accessed by a virus, and if accessed, which port of the I/O port 25 is accessed by the virus. Here, the determination is made on the basis of access information on the I/O port 25 acquired by the I/O port check board 24, the access information being included in the check result received. The check result determination unit 15 issues a check completion notification to the inspection computer 20 (step S21). The mail server 10 stores the determination into the log file 17, and shows on the monitor 18 an on-screen message such as "Attachment xxx may be infected with a virus. Launch recovery software." The recovery software is then launched to recover the attachment under the guidance (step S22) before the e-mail including the recovered attachment is sent to its original destination (step S23).

The log file 17 for storing the check determination result contains such information as log output date, log ID, log type (trouble, warning, normal), log class (system, application), urgency (1, 2, 3, 4, 5), message, and mail information (mail Id, sender, destination, sending date and time, contents type, verification result (0: not detected, 1: detected, . . . ))

As above, according to this second embodiment, the inspection computer includes the mail receiving unit for opening an attachment of e-mail received from the mail server to execute the macro, and the I/O port check board for detecting the data of the open file for write access to the I/O port to inspect virus invasion. The determination on the write access to the I/O port is sent to the mail server through the printer port. The check result determination unit of the mail server determines the presence or absence of virus infection. In the presence of virus infection, the virus is removed from the attachment in question before the e-mail is sent to its original destination. It is therefore possible to realize a virus detection system that can find even a new type of virus easily with no OS dependency. In addition, the access information on the I/O port is transmitted from the inspection computer to the mail server through the printer ports.

Incidentally, the embodiments described above have dealt with the cases where the LED is used as the warning means for situations where the inspection computer may be virus-infected. Nevertheless, the warning may be given by means of other light, sound, or text, or a combination of these. In the second embodiment, the access information on the I/O port acquired by the I/O port check board may be transmitted to the mail server by using parallel input/output devices, serial input/output devices, or boundary scan communication devices, instead of the printer ports.

While the invention has been described in conjunction with the preferred embodiments shown in the drawings, it will be obvious to those skilled in the art that changes and modifications may be readily made to the invention, and it is intended that all such changes and modifications fall within the scope of the invention.

What is claimed is:

1. A virus detection apparatus comprising a mail server and an inspection computer connected to the mail server,
   wherein said inspection computer comprises:
   file opening means for opening an attachment of e-mail transferred from said mail server;
   an I/O port for establishing interface connection with a PC, said PC being connected to said inspection computer to send and receive e-mail to/from said mail server through said inspection computer;
   virus inspecting means for detecting data of said attachment opened by said file opening means if access to said I/O port is made by the data to inspect virus invasion; and
   warning means for outputting a warning signal from said virus inspecting means when the access to said I/O port is detected in the data, and
   wherein said server comprises:
   a mail sending/receiving unit for receiving the e-mail;
   I/O port-means connected to the mail sending/receiving unit and communicating with the I/O port of the inspection computer, and
   a check result determination unit connected to the I/O port-means for determining whether the attachment of the e-mail is infected with a virus based on access information to the I/O port through the virus inspecting means,
   wherein, in the inspection computer, the file opening means opens the attachment of the email received from the mail server to execute a macro of the attachment, and the virus inspecting means checks only whether or not macro data of the attachment accesses to a certain I/O port for writing, said check result determination unit sending a check result to the inspection computer and operating a recovery software to recover the attachment.

2. The virus detection apparatus according to claim 1, further comprising transferring means for transferring the attachment of the e-mail from said mail server to said inspection computer.

3. The virus detection apparatus according to claim 1, wherein said virus inspecting means acquires access information on said I/O port from the data of said attachment and sends the access information to said mail server.

4. The virus detection apparatus according to claim 3, wherein communication is conducted between said virus inspecting means and said mail server through any of a printer port, a parallel input/output device, and a serial input/output device installed on said mail server, whereby a determination is made as to said access information on said I/O port acquired from said attachment by said virus inspecting means.

5. The virus detection apparatus according to claim 1, further comprising means for detecting the data of said attachment for access to a memory or an external input/output device, said memory or said external input/output device being peripheral equipment of said PC.

6. The virus detection apparatus according to claim 1, wherein said mail server further comprises an input/output interface, and said inspection computer further comprises an input/output interface communicating the input/output interface of said mail server and a mail receiving unit so that the attachment of the e-mail is received by the mail receiving unit through said input/output interfaces.

7. The virus detection apparatus according to claim 6, wherein said inspection computer further comprises means for reinstalling an infected application or all necessary files for file restoration if the access to the I/O port is detected.

8. A virus detection method comprising the steps of:
   opening, in an inspection computer, an attachment of e-mail transferred from a mail server to execute a macro of said attachment;
   checking whether executed macro data of the attachment accesses to a certain I/O port for writing or not by using an I/O port check board, said I/O port establishing interface connection between said inspection computer and peripheral equipment of a PC;
   reinstalling an infected application or all necessary files for file restoration if the access to the I/O port from the executed macro data of the attachment is detected;

transferring access information regarding the access to the I/O port from the data to the mail server;

determining whether or not the attachment of the e-mail is infected with a virus based on the access information to the I/O port in the mail server; and sending a check result to the inspection computer and operating a recovery software to recover the attachment in the mail server.

9. The virus detection method according to claim 8, wherein the data of said attachment is inspected if access to a memory or a hard disk is made by the data, said memory or said hard disk being peripheral equipment of said PC.

10. A virus detection system comprising a mail server and an inspection computer connected to said mail server, wherein said inspection computer comprises:

file opening means for opening an attachment of e-mail transferred from said mail server;

an I/O port for establishing interface connection between said inspection computer and peripheral equipment of a PC; and an I/O port check board for detecting only whether or not macro data of the attachment accesses to a certain I/O port for writing to inspect virus invasion, said macro data being executed by opening the attachment of the e-mail received from the mail server by said file opening means, the attachment of the e-mail transferred from said mail server being opened and executed, and being inspected and determined for presence or absence of access to said I/O port by the macro data of the attachment by using said I/O port check board, and wherein said server comprises:

a mail sending/receiving unit for receiving the e-mail;

I/O port-means connected to the mail sending/receiving unit and communicating with the I/O port of the inspection computer, and a check result determination unit connected to the I/O port-means for determining whether the attachment of the e-mail is infected with a virus based on access information to the I/O port through the virus I/O port check board, said check result determination unit sending a check result to the inspection computer and operating a recovery software to recover the attachment.

11. The virus detection system according to claim 10, wherein in said mail server, the virus is removed from said attachment in a case where the attachment is determined to be infected with the virus through the virus inspection before e-mail including said attachment is sent to its original destination.

12. The virus detection system according to claim 10, wherein said mail server further comprises an input/output interface, and said inspection computer further comprises an input/output interface communicating the input/output interface of said mail server and a mail receiving unit so that the attachment of the email is received by the mail receiving unit through said input/output interfaces.

13. The virus detection system according to claim 12, wherein said inspection computer further comprises means for reinstalling an infected application or all necessary files for file restoration if the access to the I/O port is detected.

* * * * *